3,496,770
BOAT VELOCITY INDICATING ARRANGEMENT
James M. Fassett II, Los Angeles, Calif.
(23320 Anza Ave., Torrance, Calif. 90505)
Filed Jan. 10, 1968, Ser. No. 696,788
Int. Cl. G01c 21/00
U.S. Cl. 73—187                                    7 Claims

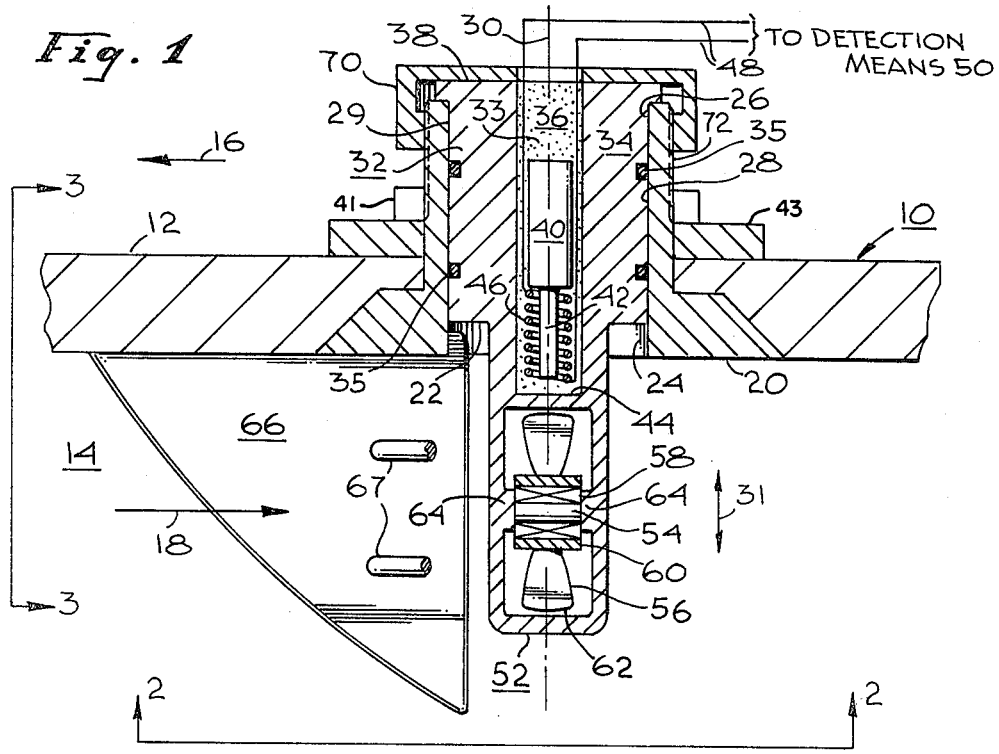
Fig. 1
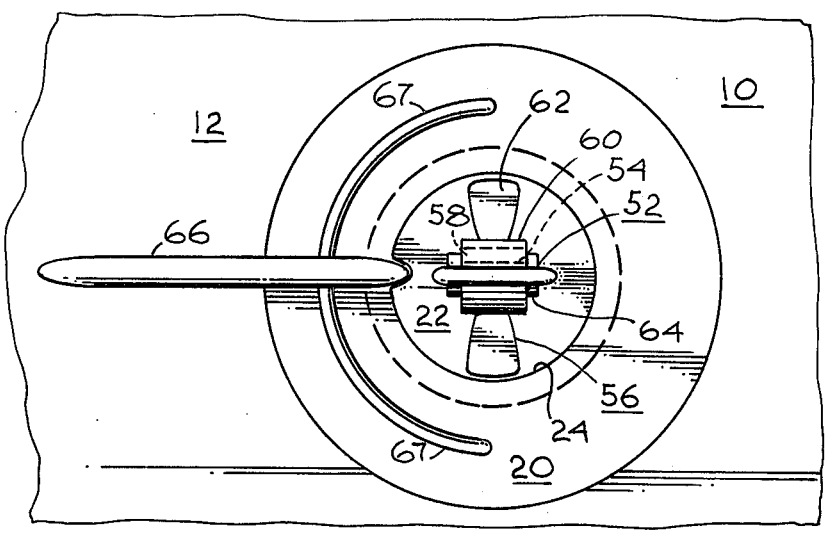
Fig. 2
INVENTOR
JAMES M. FASSETT, II
ATTORNEY Feb. 24, 1970  J. M. FASSETT II  3,496,770
BOAT VELOCITY INDICATING ARRANGEMENT
Filed Jan. 10, 1968  2 Sheets-Sheet 2
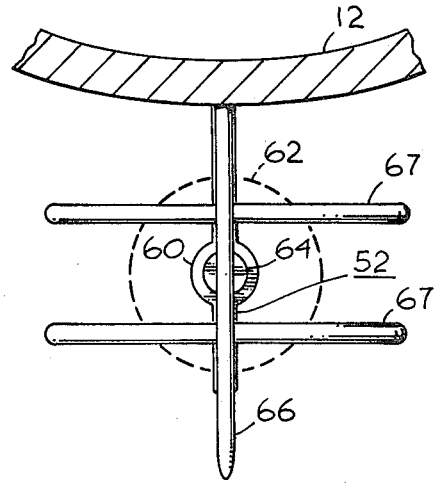
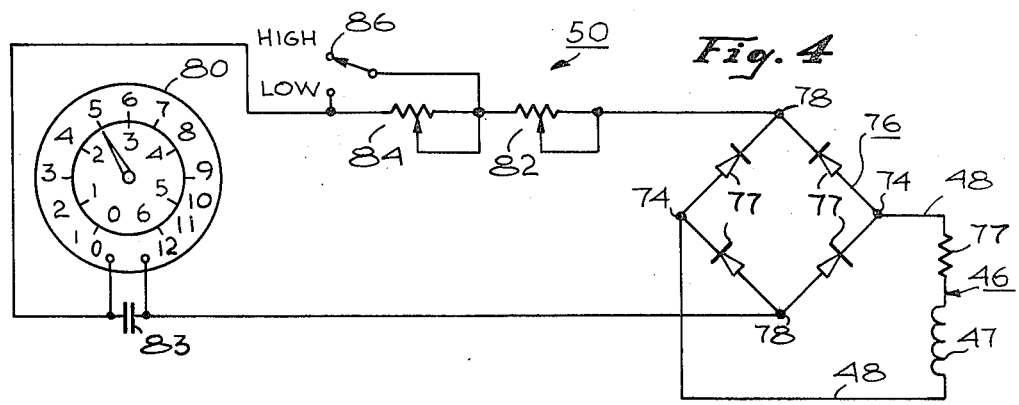
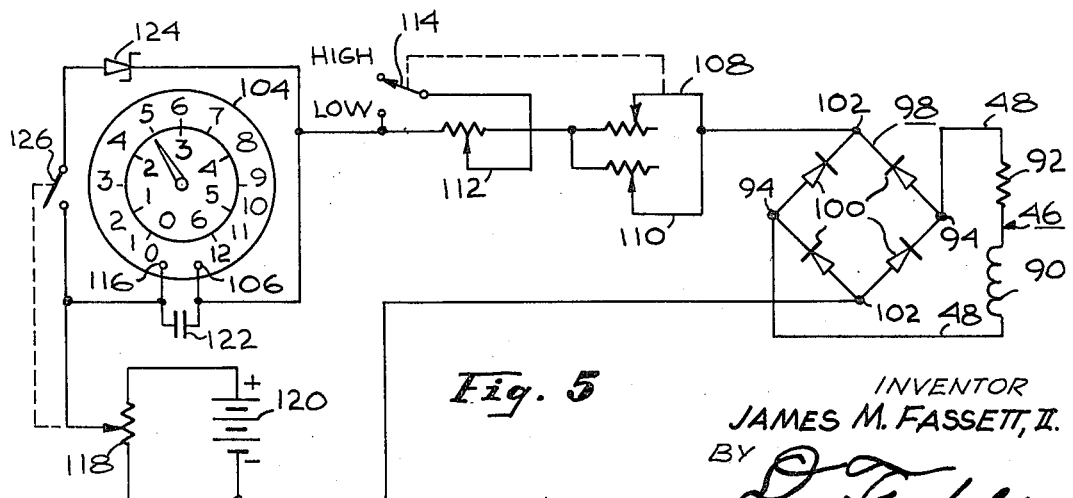
INVENTOR
JAMES M. FASSETT, II.
BY
Don Finkelstein
ATTORNEY United States Patent Office 3,496,770
Patented Feb. 24, 1970

ABSTRACT OF THE DISCLOSURE

There is disclosed herein a boat velocity indicating arrangement that is slidably mounted in a through-hull fitting on the boat and is extendable to have a propeller means in the water. The propeller means is in a unidirectional magnetic field and an electrically conductive means, such as a coil, is positioned adjacent to the propeller means so that as the water rotates the propeller, an information signal is generated in the coil. Detection means are provided for measuring the magnitude of the signal generated in the coil, to provide a measurement of the velocity of the boat relative to the water.

BACKGROUND OF THE INVENTION

Field of the invention

This invention relates to the velocity measuring art and more particularly to a velocity measuring arrangement for measuring the velocity of boats relative to the water.

Description of the prior art

In many applications, particularly in sailboat racing and sailboat cruising applications, it is desirable to measure the speed of a boat relative to the water. Such arrangements are variously called boat speedometers, boat velocity indicators or the like. In many instances, these arrangements have comprised comparatively high drag units that tend to impede the progress of a boat. In sailboat racing, particularly, it will be appreciated, speed differentials on the order of a quarter or half a knot are often the difference between the first and last place in a boat race and consequently high drag items must be avoided if the highest performance of which the boat is capable is to be attained. Reliability and sensitivity of the boat speedometer are also important in racing applications. In sailboat cruising, not only is reliability important, but accuracy for navigational purposes is also important.

Further, since there is generally a portion of the velocity indicator that extends into the water, it is not only desirable to have this portion providing a comparatively low drag configuration but also, preferably, should be fully retractable from the water and/or removable so that convenient servicing and maintenance of the velocity indicator may be readily achieved and also to insure that the velocity indicator is not damaged when the boat is sailed or docked in debris-laden waters; or fouled by marine growth.

In addition, it is also preferable that the velocity indicating arrangement be completely self-powered and not require an external source of electrical energy since electrical energy on a sailboat is generally at a premium and the voltage thereof may often vary extensively depending upon the condition of the battery. This criteria is not of prime importance, of course, where the boat is sufficiently large enough to carry a motor-generator combination for providing electrical energy.

However, it is often desired that not only should the velocity indicating arrangement be free of comparatively expensive and complicated electronic amplifiers and circuitry, in order that the cost of the velocity indicator be maintained as low as possible, but even more importantly, the reliability of the system should be as high as practically attainable.

SUMMARY OF THE INVENTION

The above and other desiderata are achieved, in a preferred embodiment of applicant's invention, by providing a through-hull fitting at a preselected location on the boat below the waterline thereof. The through-hull fitting is an item of standard marine hardware and, in itself, does not form a part of applicant's invention herein, but, rather, is utilized in the preferred embodiment of applicant's invention to provide the necessary supporting structure for applicant's improved velocity indicator arrangement.

The through-hull fitting in this embodiment has a generally circular aperture extending therethrough and applicant's velocity indicator is slidably positioned within the circular aperture of the through-hull fitting. The velocity indicator comprises a body member having an axially oriented cavity therein and seal means, such as a pair of O-rings on the external surface thereof, to provide a water tight seal between the interior walls of the through-hull fitting and the external walls of the body member.

A permanent magnet is positioned within the cavity in the body member and has a pole piece attached thereto and the pole piece may be, for example, a soft iron construction and is adjacent the external end of the cavity. A coil of wire is wound around the pole piece and has leads extending through the cavity into the interior of the boat.

The body member has a portion that is adapted to be extended into the water regions, external the boat when it is desired to read the velocity of the boat relative to the water. The external portion of the body member is provided with a propeller means rotatably mounted thereon and positioned to rotate in the unidirectional magnetic field generated by the magnet. The propeller has magnetic field permeable blades rotating adjacent the coil and pole piece. As there is water movement relative to the boat, the propeller is rotated at a rate that is proportional to the velocity of the water relative to the boat. Therefore, there is generated within the coil an alternating current information signal having a magnitude proportional to the rotational rate of the propeller which, in turn, is proportional to the velocity of the water relative to the boat.

A detection means is coupled to the leads of the coil, and detects and measures the magnitude of the information signal. In the preferred embodiment of applicant's invention, the detection means comprises both a rectifier means for converting the alternating current information signal into a direct current information signal having a magnitude proportional to the magnitude of the alternating current information signal and a direct current voltmeter for indicating the magnitude of the direct current information signal.

The entire body member, including the propeller means is slidably movable in the through-hull fitting and may be removed therefrom from the interior of the boat when desired.

Thus, applicant's velocity indicating arrangement is completely self-powered and requires no external power connections. Further, utilization of the voltage generated by the rotation of the propeller allows utilization of a direct reading circuitry in which further electronic amplification of the signal is not required.

BRIEF DESCRIPTION OF THE DRAWING

The above and other embodiments of applicant's invention may be more fully understood from the following detailed description taken together with the accompanying drawing wherein similar reference characters refer to similar elements throughout and in which:

FIGURE 1 is a sectional view of the structure associated with one embodiment of applicant's invention;

FIGURE 2 is a view along the line 2—2 of FIGURE 1;

FIGURE 3 is a view along the line 3—3 of FIGURE 1;

FIGURE 4 is a schematic diagram of a detection system useful in the practice of applicant's invention herein; and FIGURE 5 is a schematic diagram of another detection system.

DESCRIPTION OF THE PREFERRED EMBODIMENTS

As noted above, applicant's boat velocity indicator arrangement invention herein is particularly useful in applications involving sailboat racing. However, utilization of this particular example as one embodiment of applicant's invention is not intended to be limiting to applicant's invention nor are the particular structural details shown on the accompanying drawing and as described below.

Referring now to the drawing there is shown in FIGURES 1, 2 and 3, the structure associated with the preferred embodiment of applicant's invention. As shown thereon, there is a boat, generally designated 10, having a hull 12, and, for example, the boat 10, may be moving through the water 14 in a direction indicated by the arrow 16.

Consequently, the water 14 is moving at approximately the same velocity relative to the boat 10 in the opposite direction as indicated by the arrow 18. The local velocity of the water at any point on the hull will, in general, be different from the velocity of the boat through the water depending on the shape of the hull and the location of the point in question. The boat 10 is provided with a through-hull fitting 20 at a preselected position on the hull 12, which position may be in an area where, for example, the water 14 is flowing in a direction most nearly directly opposite to the directional movements of the boat as indicated by the arrow 16. Such position may, for example, be on or near the centerline or keel of the boat, or such other location as may be desired. However, as described below in greater detail, the velocity indicator of applicant's invention herein may be suitably calibrated so that the true relative velocity for any given installation may be determined from the velocity reading obtained.

The through-hull fitting 20 is an item of commercially available marine hardware and the design and installation thereof do not form a part of applicant's invention herein but only exemplify one means of supporting applicant's improved velocity indicator arrangement.

The through-hull fitting 20 has a circular aperture 22 extending therethrough from water regions external the boat 10, as indicated at a first end 24 thereof, to regions interior the boat 10 as indicated by a second end 26 thereof. The circular aperture 22 is defined by the interior wall portion 28 of the through-hull fitting 20 and may be coaxially aligned with axis 30.

A body member 32 is slidably mounted in the circular aperture 22 and is adapted to slide therein in directions indicated by the arrow 31. Seal means, such as O-rings seal 35, are provided on the external wall 29 of the body member 32 for water-tight sealing with the wall portion 28 of the through-hull fitting 20. Thus, water 14 cannot enter into the interior of boat 10 through the interface between the through-hull fitting 20 and the body member 32.

The body member 32 has an interior portion 34 having an axial cavity 36 extending a predetermined distance from the interior end 38. In the preferred embodiment of applicant's invention, the axial cavity 36 is circular in section and is coaxially aligned with the axis 30.

A permanent magnet 40 is positioned within the axial cavity 36. A pole piece 42 is coupled to one end of the permanent magnet 40 and extends therefrom toward the external end 44 of the cavity 36. The pole piece 42 may be, for example, of soft iron.

An electrically conductive means, such as an electrically conductive coil 46, is wound around the pole piece 42, and has leads 48 extending from the cavity 36 to regions interior the boat 10 and the leads 48 are connected to a detection means 50. The detection means 50 is illustrated in FIGURE 3 and is described in greater detail below.

The body means 32 is also provided with a propeller portion 52 that extends externally the interior portion 34. External portion 52 of the body means 32 is provided with a shaft 54 upon which is journaled a propeller means 56 on bearings 58. The propeller means 56 is comprised of a hub portion 60 and a plurality of blades 62. In this embodiment of applicant's invention the blades 62 are made of a highly magnetic field permeable material, such as, for example, the 400 series corrosive resistant steels, or other ferromagnetic materials.

As shown on the drawing, the propeller portion 52 of the body member 32 provides a form of cage-like member for both supporting the shaft 54 in hub sections 64 as well as providing protection to the propeller means 56. Additional protection thereto may be provided by deflection plate 66 that is coupled to the through-hull fitting 20 and extends forwardly of the propeller means 56. Similarly, the pair of arm means 67 coupled to the deflection plate 60 to aid in deflecting weeds from entanglement with the propeller means 56.

The cavity 36 may if desired be filled with a suitable potting compound 33 to restrain the magnetic field generating means, such as the magnet 40, the pole piece 42 and the coil 46 therein, in a predetermined geometric relationship.

The body member 32 may be restrained in the circular aperture 22 by a cap means 70 that threadingly engages the external wall 72 of the through-hull fitting 20 and bears against the interior end 38 of the body member 32.

The through-hull fitting may be restrained in the hull 12 of boat 10 by nut means 41 threadingly engaging the external wall 72 thereof and to prevent damage to the hull 12, bears against a spacer disc 43. The spacer disc 43 is preferably made from a partially deformable material such as wood that does not damage the hull 12 by the clamping action of the nut 41.

The magnetic field generator, such as the magnet 40, generates a undirectional magnetic field in regions containing the pole piece 42, the coil 46 and the propeller 56.

The propeller 56 is adapted to be rotated by the flow of water as the boat 10 moves in a direction indicated by the arrow 16. Therefore, water flowing relative to the boat 10 in the direction indicated by the arrow 18 rotates the propeller 56 and the rotational rate thereof is proportional to the velocity of the water 14 moving in the direction of the arrow 18.

Since the propeller 56 is in a unidirectional magnetic field and the propeller blades 62 are made of a magnetic field permeable material, as noted above, the rotation of the propeller 56 generates an information signal in the coil 46. The information signal generated into coil 46 is an alternating current signal having a magnitude proportional to the rotational rate of the propeller 56. Thus, as can be seen from the drawing, there is provided a structure for generating an information signal having a magnitude proportional to the velocity of the water relative to the boat 10. No external power connections are required for the velocity indicator and the magnitude of the signals provided by this arrangement are sufficiently strong so that no further amplification thereof is necessary and direct reading thereof may be obtained.

In the preferred embodiment of applicant's invention it is desired to convert the alternating current information signal generated in coil 46 to a direct current information signal. Applicant achieves this result by the detection means 50 as noted above and as shown on FIGURE 4.

The leads 48 of the coil 46 are connected to a first pair of opposite terminals 74 of a diode bridge 76 and, in schematic form, coil 46 appears in series with a resistor 78 being the equivalent resistance of the coil 46 and the inductance 47 being the equivalent inductance thereof. The diode bridge 76 is comprised of the four diodes 77 and is a rectifier and rectifies the AC information signal generated in the coil 46 to a direct current information signal having a magnitude proportional to the magnitude of the alternating current information signal. The direct current information signal is obtained from diode bridge 76 at a second pair of opposite terminals 78 thereof, and is connected to an indicating means, such as the direct current voltmeter 80. In the preferred embodiment of applicant's invention herein the direct current voltmeter 80 is calibrated to read in knots rather than volts so that a direct reading of the speed of the boat may be obtained.

The direct reading voltmeter 80 in the preferred embodiment of applicant's invention is a dual range meter. That is, it is provided with a dual range scale on the face thereof. For sailboat racing, such a scale may, for example, have a first velocity range and a second velocity range from 0 to 6 knots which may be considered the low velocity range.

Applicant prefers to provide in this embodiment, for a first variable resistor 82 and a second variable resistor 84 connected in series with the indicator means 80 and the diode bridge 76, to provide accurate speed calibration in each installation, and for both the high and low speed ranges. A switch 86 is provided to switch from high range to low range. For the position shown in FIGURE 4, the switch 86 is in the high range position and it may be seen that the second variable resistor 84 is in the circuit of the indicator means 80 and diode bridge 76 and consequent variations of the resistance of the second variable resistor 84, for any given setting of the first variable resistor 82, will provide meter adjustment for the high range.

When the switch 86 is switched to the low position, the second variable resistor 84 is shorted from the indicator circuit and the first variable resistor may be utilized to provide meter adjustment for the indicator means 80 in the low velocity range position.

A capacitor 83 may be connected across the meter 80 for dampening.

As shown on the drawing, the body member 32 upon which are mounted all of the components defining the structure of the mechanism for generating the information signal having a magnitude proportional to the velocity of the water 14 relative to the boat 10 may, if desired, be completely removed from the through-hull fitting 20 from the interior boat by first removing the cap means 70. A suitable plug must then be installed, quickly, to seal the circular aperture 22. Thus the entire structural assembly may be conveniently removed for servicing, maintenance and storage internal the boat 10.

Applicant's unique structural arrangement provides that there are no rotating seals in the water 14, as only the bearings 58 necessary for supporting the propeller 56 rotatably on the propeller portion 52 of the body member 32 are present. The two O-ring seals 36 are static seals and can thus provide substantially water tight sealing.

Further, as can be seen from FIGURE 3, the drag of the speed direction unit is comparatively low since the structure in the water presents a very low area at right angles to the direction of travel. Applicant's improved velocity measuring arrangement achieves this comparatively low frontal area and, consequently, low drag configuration, in part, by providing the propeller means 56 rotating about a horizontally aligned axis.

The unique circuitry utilized in the detection means 50 allows substantially full scale deflection of the indicator means 80 for either high range or the low range of velocities.

In some applications, and under certain sailing conditions, it is often desirable to detect comparatively small changes in the speed of the boat without regard to the absolute speed of the boat. For example, when traveling at comparatively low velocities, such as for example, 2 knots, the best performance from the boat can be obtained by detecting very small changes in velocity. Similarly, in comparatively long runs with the wind wherein the velocity is comparatively constant, very small changes in the velocity, that may be provided by sail adjustment, slight course adjustment or the like can provide better performance from the boat. The structure above defined as shown in FIGURES 1, 2 and 3 may be utilized to provide the information concerning comparatively small changes in the boat velocity.

For example, with any given size meter, it can be seen that the sensitivity thereof on the high velocity scale, and by sensitivity it is meant the comparative needle deflection for a given velocity change, is not very great. Similarly, for traveling at the above-mentioned 2 knots, it can be seen that the sensitivity of the low speed scale cannot provide the monitoring of velocity changes on the order of 0.1 knot or so with a high degree of accuracy.

The schematic diagram shown in FIGURE 5 illustrates another detection system useful in the practice of applicant's invention. The detection system shown on FIGURE 5 is similar to the detection system shown on FIGURE 4 and accomplishes the same function thereof, but, in addition, provides a method for detecting comparatively small velocity changes at any absolute velocity of the boat.

As shown on FIGURE 5, the coil 46 is represented schematically by the equivalent coil inductance 90 and equivalent coil resistance 92, connected by the leads 48 to a pair of opposite terminals 94 of diode rectifier bridge 98 comprised of the four diodes 100. The rectifier bridge 98 and diodes 100 may be similar to the rectifier bridge 76 and diodes 77, shown in FIGURE 3. That is, the rectifier bridge 98 rectifies the alternating current information signal generated in the coil 46 to a direct current information signal having a magnitude proportional to the magnitude of the alternating current information signal.

The direct current information signal is obtained from the diode bridge 98 at a second pair of opposite terminals 102 thereof and is connected to an indicating means such as the direct current voltmeter 104 which, for example may be similar to the direct current voltmeter 80 shown in FIGURE 3, and, similarly, may be calibrated to read in knots rather than in volts so that a direct reading of the boat velocity may be obtained.

The direct reading voltmeter 104 is, in the preferred embodiment of the detection system shown on FIGURE 5, a dual range meter and is provided with a dual range scale on the face thereof. This scale may have, as described above, in connection with the description of the direct reading voltmeter 80 on FIGURE 3, a first scale for high velocities in the range of 0 to 12 knots and a second scale for low velocities in the range of 0 to 6 knots.

A first terminal 106 of the meter 104 is connected to one of the pair of terminals 102 of rectifier bridge 98 through a sensitivity variable resistor 108, a low speed variable resistor 110 for low speed calibration which, for example may be similar to the first variable resistor 82 shown in FIGURE 3 and a high speed variable resistor 112, which, for example, may be similar to the second variable resistor 84 shown on FIGURE 3. A speed range switch means, 114, which may be similar to the switch 86 shown in FIGURE 3, is connected across the high velocity variable resistor 112 so that when the speed range switch 114 is in the "High" position, as shown in FIGURE 5, the high velocity variable resistor 112 is in the circuit and when the speed range switch 114 is in the "Low" velocity position, the high velocity variable resistance 112 is shorted from the circuit.

When the speedometer is calibrated and the proper adjustments made to the high velocity variable resistor 112 and low velocity variable resistor 110, the sensitivity variable resistor 108 is in the maximum resistance position so that the maximum resistance thereof is in series with the variable resistor 112, and in parallel with variable resistor 110.

The other terminal 116 of the meter 104 is connected to a potentiometer 118 connected across a separate source of direct current, such as a battery 120. This parallel connection of the potentiometer 118 and battery 120 is connected between the other terminal 102 of rectifier bridge 98 and the second terminal 116 of the meter 104. A capacitor 122 may be connected across the meter 104, as shown, between the terminals 106 and 116 thereof to provide damping and, in this embodiment of applicant's invention, a Zener diode 124 is also connected across the terminals 106 and 116 and is placed into the circuit by switch means 126 so that the Zener diode 124 is only in the circuitry when the variable resistor 118 is being utilized, as described below, and protects the meter from possible overloading. Potentiometer 118 and switch 126 are coupled together in such a way that swich 126 is open when the slider of potentiometer 118 is at one limit of its travel and open at any other position of the slider of potentiometer 118.

Utilization of the detection system shown in FIGURE 5 to detect comparative small changes in boat velocity may be achieved as follows. For example, if the boat is traveling at a comparatively low velocity, such as two knots, the speed range selection switch 114 is in the low position thereby shorting high speed variable resistor 112 from the circuit, and under this condition, it may be desired to detect comparatively small changes in the boat velocity. That is, increasing the sensitivity reading of the meter 104, as opposed to detecting only the absolute velocity as measured on the scale of meter 104, with the normal variations of meter deflection with speed.

This may be achieved by closing the switch 126 and adjusting the potentiometer 118. Adjustment of the potentiometer 118 provides a biasing voltage from the battery 120 to the meter 104 so that, for example, the meter deflection may be centered for any desired absolute speed. When so adjusted by the potentiometer 118, it will be appreciated, the meter 104 is no longer reading the true boat velocity.

The Zener diode 104 as noted above, prevents overloading of the meter and consequent damage therefrom.

The sensitivity variable resistor 108 may then be adjusted by decreasing the resistance thereof to any desired value and, the more the resistance is decreased, that is the less resistance there is from the sensitivity variable resistor 108 in the circuit, the greater will be the needle deflection on the meter 104 for a given change in boat velocity. This, if the sensitivity variable resistance 108 is decreased to the minimum value the maximum deflection will be obtained for a given boat velocity change.

It will be appreciated, of course, that the increase in detection of comparatively small changes in velocity may also be accomplished at the high speed setting when the high speed variable resistor 112 is in the circuit, through, of course, the actual needle deflection for given velocity changes will not be as great for any given setting of the sensitivity variable resistor 108 as in the low range.

It must be remembered of course, that when the detection system illustrated in FIGURE 5 is being utilized as described above the indicated velocities on the scale of the meter 104 are not the actual velocities of the boat, but rather, the meter is being utilized as a speed differential detector to monitor the comparatively small relative speed changes.

It is apparent, of course, that applicant's improved boat velocity indicator works equally well for both forward and backward movement of the boat relative to the water. Further, while applicant has illustrated and described his invention in the preferred embodiments thereof as utilizing a DC voltmeter and rectifier diode bridge, it is obvious to those skilled in the art that an AC voltmeter could equally well be utilized and the rectifier diode bridge, of course, omitted.

This concludes the description of applicant's invention of an improved velocity indicator arrangement. Those skilled in the art may find many variations and adaptations of applicant's invention and the following claims are intended to cover all such variations and adaptations falling within the true scope and spirit of applicant's invention.

What is claimed is:
1. A boat velocity indicator of the type providing the measurement of the speed of a boat relative to the water in which the boat is located comprising, in combination:
    a through-hull fitting means coupled to the hull of the boat and positioned thereon below the water line of the boat, and said through-hull fitting means having walls defining an axial aperture therethrough and said aperture extending from regions external the hull of the boat to regions internal the hull of the boat, and said walls of said through-hull fitting having an interior portion interior the hull of the boat;
    means for restraining said through-hull fitting in the hull, and said means for restraining comprising:
        a partially deformable spaced disc positioned adjacent interior surfaces of the hull and surrounding said walls of said through-hull fitting;
        a nut means threadingly engaging external surfaces of said internal portion of said walls of said through-hull fitting and bearing against said partially deformable spacer disc to restrain said through-hull fitting in a preselected location in the hull;
    a body member slideably mounted in said aperture of said through-hull fitting for at least partial extension from interior portions of the boat to water regions external thereof;
    seal means for providing a water tight seal between said body member and said walls defining said aperture of said through-hull fitting;
    said body member having walls defining a substantially axial cavity therein and said axial cavity of said body member substantially coaxially aligned with the axis of said aperture in said through-hull fitting;
    a magnetic field generating means coupled to said body member for generating a unidirectional magnetic field and positioned within said cavity of said body member;
    an electrically conductive means coupled to said body member in said cavity in said body member and adjacent said magnetic field generating means and within said unidirectional magnetic field;
    cap means detachably coupled to interior portions of said walls of said through-hull fitting and bearing against an interior end surface of said body member to restrain said body member within said aper- ture in said through-hull fitting, whereby detaching said cap means from said through-hull fitting allows removal of said body member from said aperture in said through-hull fitting from regions internal the hull;

propeller means rotatably mounted on said body member adjacent said electrically conductive means and within said unidirectional magnetic field and selectively positioned external the boat hull to be rotated by the water relative to the boat, at a rotational rate proportional to the relative velocity of the water, whereby said rotation of said propeller means generates an information signal in said electrically conductive means and said information signal has a magnitude proportional to the rotational rate of the propeller; and a detection means for detecting and measuring the magnitude of said information signal.

2. The arrangement defined in claim 1 wherein said magnetic field generating means comprises:

a permanent magnet portion for generating said unidirectional magnetic field;

and a soft iron pole piece portion coupled thereto and said pole piece portion adjacent said external end of said cavity in said body member;

said electrically conductive means comprises a coil of electrically conductive wire wound around said pole piece and having leads thereto extending through said cavity to regions interior the boat;

and said propeller means has a plurality of magnetically permeable blades for rotation in said unidirectional magnetic field to generate an alternating current information signal in said coil.

3. The arrangement defined in claim 1 wherein said information signal generated in said coil means is an alternating current information signal and said detection means is coupled to said electrically conductive means and further comprises:

rectifier means for rectifying said alternating current information signal to a direct current information signal having a magnitude proportional to the magnitude of said alternating current information signal;

and indicator means for indicating the magnitude of said direct current information signal.

4. The arrangement defined in claim 3 wherein:

said rectifier means comprises a diode bridge means and said electrically conductive means is connected across a first pair of opposite terminals thereof;

and said indicator means comprises a direct current voltmeter across the second half of opposite terminals of said diode bridge means.

5. A boat velocity indicator of the type providing the measurement of the speed of a boat relative to the water in which the boat is located comprising, in combination:

a through-hull fitting means coupled to the hull of the boat and positioned thereon below the water line of the boat;

means for restraining said through-hull fitting in the hull;

a body member slideably mounted in said through-hull fitting for at least partial extension from interior portions of the boat to water regions external thereof;

seal means for providing a water tight seal between said body member and said through-hull fitting;

magnetic field generating means coupled to said body member for generating a unidirectional magnetic field;

an electrically conductive means coupled to said body member adjacent said magnetic field generating means and in said unidirectional magnetic field;

propeller means rotatably mounted on said body member adjacent said electrically conductive means and within said unidirectional magnetic field and selectively positioned external the boat hull to be rotated by the water relative to the boat, at a rotational rate proportional to the relative velocity of the water, whereby said rotation of said propeller means generates an information signal in said electrically conductive means and said information signal has a magnitude proportional to the rotational rate of the propeller;

a detection means for detecting and measuring the magnitude of said information signal;

said information signal generated in said coil means is an alternating current information signal and said detection means is coupled to said electrically conductive means and further comprises:

rectifier means comprising a diode bridge means and said electrically conductive means is connected across a first pair of opposite terminals thereof, for rectifying said alternating current information signal to a direct current information signal having a magnitude proportional to the magnitude of said alternating current information signal;

and indicator means comprising a direct current voltmeter coupled across the second half of opposite terminals of said diode bridge means, for indicating the magnitude of said direct current information signal;

said detection means further comprises a dual range read out circuit and said dual range read out circuit comprises:

a first and a second variable resistor means connected in series between said direct current voltmeter and said diode bridge means, said first variable resistor for meter balancing adjustment for the velocity of the boat in a first velocity range, said second variable resistor for meter balancing adjustment for the velocity of the boat in a second velocity range and said second velocity range having a velocity greater than any velocity in said first velocity range;

means for selectively shorting said second variable resistor from said circuit;

and said direct current voltmeter providing substantially full scale deflection for the boat having a predetermined velocity in the first velocity range and a predetermined velocity in the second velocity range different than said predetermined velocity in said first velocity range.

6. The arrangement defined in claim 5 and further comprising:

a sensitivity variable resistor connected in series with said first and in parallel with said second variable resistors between a first terminal on said direct current voltmeter and one of said second pair of terminals on said diode bridge means;

variable voltage generator means connected between the second of said second pair of terminals on said diode bridge and the other of said terminals on said meter for providing a variable direct current voltage in opposition to the direct current voltage supplied from said coil to said direct current voltmeter to vary the indicated meter reading for a given velocity;

whereby variations of the resistance of said sensitivity variable resistor varies the indicated meter deflections on said direct current voltmeter for given variations in boat velocity.

7. The arrangement in claim 6 wherein:

said variable voltage producing means comprises a variable resistor and a source of direct current energy connected in parallel;

and further comprising:

a capacitor means connected between said terminals of said direct current voltmeter to provide damping therein;

and means for protecting said direct current voltmeter from overload for the condition of said parallel connected variable resistor and source of direct current energy applying voltage to said meter.

References Cited

UNITED STATES PATENTS 2,127,847   8/1938   Schulte _____ 73—187
3,003,354   10/1961   Wood _____ 73—187

FOREIGN PATENTS 672,538   9/1929   France.
357,163   4/1938   Italy.

DONALD O. WOODIEL, Primary Examiner

U.S. Cl. X.R.

324—70